(No Model.)
D. E. JOHNSON.
CONDUIT FOR ELECTRIC RAILWAYS.
No. 420,804. Patented Feb. 4, 1890.
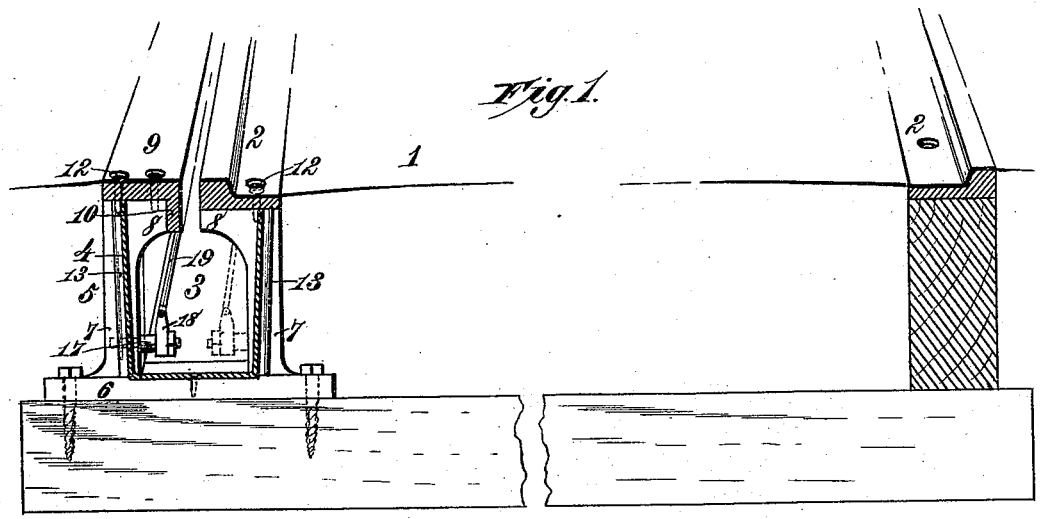
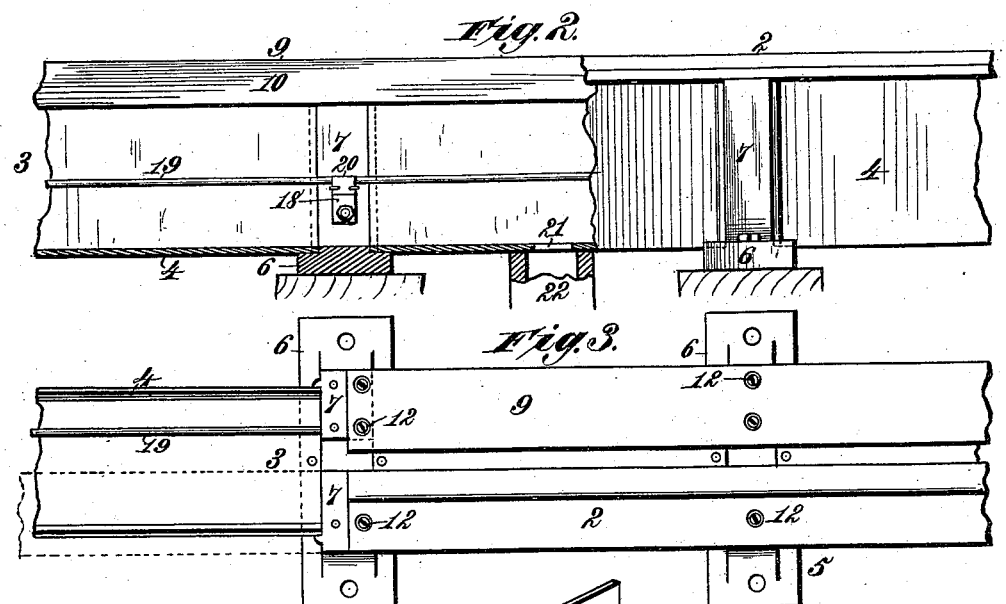
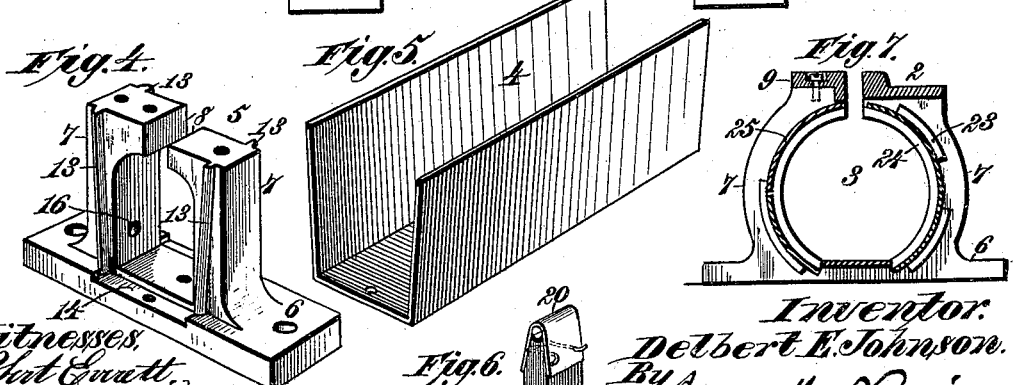
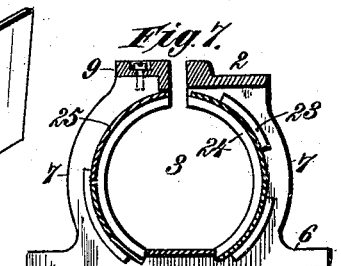
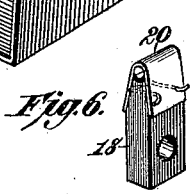
Witnesses:
Robert Gwatt
J. A. Rutherford
Inventor:
Delbert E. Johnson.
By James L. Norris
Atty

UNITED STATES PATENT OFFICE.

DELBERT E. JOHNSON, OF ATLANTA, GEORGIA.

CONDUIT FOR ELECTRIC RAILWAYS.

SPECIFICATION forming part of Letters Patent No. 420,804, dated February 4, 1890.

Application filed March 7, 1889. Renewed January 11, 1890. Serial No. 336,632. (No model.)

*To all whom it may concern:*

Be it known that I, DELBERT E. JOHNSON, a citizen of the United States, residing at Atlanta, in the county of Fulton and State of Georgia, have invented new and useful Improvements in Conduits for Electric Railways, of which the following is a specification.

My present invention relates to the construction of conduits for electric railways, and the purpose thereof is to so form and locate the conduit as to effect the maximum economy of space and expense both in the construction of the road and the cost of raw material, while at the same time I avoid, so far as the necessary conditions permit, the tendency of carriage-wheels to run upon the slot, thereby obviating the danger of accident, the constant wear of the slot-rail, and the continual rain of dust and other foreign matters through the slot.

It is a further purpose of my invention to provide a continuous conduit of suitable form and dimensions, having a metallic or similar lining which may be laid speedily and cheaply, and any part of which may be easily and quickly removed and replaced when repairs are necessary.

My invention also contemplates a construction whereby the cables or conductors are moved from beneath the slot of the conduit, being laterally displaced from the vertical plane thereof, and thereby protected from rain, snow, and other accumulations whereby electrical contact may be obstructed, said conductors also being mounted on suitable supports disconnected from the bottom of the conduit and properly insulated.

I propose, finally, to simplify and improve the construction of the conduit and its several parts, whereby a better, drier, cleaner, more durable, and cheaper conduit is provided, the interior of which is easily accessible for repairs, removal of rubbish, and other purposes.

The invention consists in the several features of construction and new combinations of parts hereinafter fully set forth, and definitely pointed out in the claims following this specification.

Referring to the accompanying drawings, Figure 1 is a perspective view and vertical cross-section of a section of road-bed, showing my invention applied thereto. Fig. 2 is a side elevation of the conduit, partly in longitudinal section. Fig. 3 is a plan view of the parts shown in Fig. 2. Fig. 4 is a detail perspective of one of the yokes. Fig. 5 is a similar view of one of the metallic lining-sections of the conduit. Fig. 6 is a detail perspective of one of the insulating supporting plates or blocks used in connection with the cable. Fig. 7 is a detail cross-section showing a modified construction.

In the said drawings, the reference-numeral 1 denotes the roadway, which is provided with rails 2, having any suitable form or construction, the preferred form being that commonly known as the "flat rail." Upon the outside of one of said rails and beneath the same I locate the conduit 3, the body whereof is composed of a metallic lining 4, constructed in sections of any suitable length. These sections are sustained by yokes 5, each of which is formed in a single piece consisting of a foot-piece 6, from which rise the yoke-pieces 7. Each of the parts last named has a form approximating that of an inverted L, the overhanging ends 8 thereof having flat upper surfaces lying at slightly-different heights and approaching each other. These surfaces form a support for the flat rail of the road and the cover-rail 9 of the conduit, the latter consisting of an angle-plate lying upon the flat top of one of the yoke-pieces and having a flange 10, which forms one wall of the slot, the other wall being formed by the vertical face or edge of the rail 2. The latter as well as the covering-rail are fastened by bolts 12, tapped into the flat faces 8 of the yoke-pieces or by any other means suitable for the purpose. The yoke-pieces have their upper ends 8 extended inward toward the slot and are provided with horizontal surfaces, upon which rest the rails 2 and 9. The edges of the lining-sections 4 are preferably brought up to lie beneath the outer portions of the rails, so that access may be had to the conduit at any point by simply removing either one or both of the rails 2 and 9.

Upon the opposite parallel faces of the yoke-pieces 7 are formed vertical ribs 13, between which lie the ends of the metallic lining-sections 4, their bottoms being received by a shallow seat 14, formed in the foot-piece 6, whereby the floor of the conduit shall be practically flush throughout. One or more bolts may be passed through the end of the lining and tapped into a suitable aperture 15, if preferred.

Entering the inner faces of the yoke-pieces are apertures 16, which may be threaded to receive the ends of supports 17, projecting a little distance from the yoke-piece and raised off the floor of the conduit. Upon these supports are mounted insulating-blocks 18, having vertical or substantially vertical position, and having such width or thickness at their upper ends as to permit the formation of a concave seat, within which rests the cable or conductor 19. Over the latter is drawn a thin plate 20, of copper or other conductive material, the ends of which are lapped upon the opposite faces of the insulating-support 18 and fastened by rivets or other devices. This construction provides a secure fastening for the conductor, over which the traveler or contact wheel passes without impediment or disturbance.

I may support a conductor upon each of the yoke-pieces, as indicated by dotted lines in Fig. 1; but in either case the wire is laterally removed from beneath the slot, whereby it is much less liable to receive dust, rain, and other foreign matter, or become obstructed by ice.

At suitable points in the course of the conduit I form openings 21 in the floor of the same, which communicate with pipes 22 or other passages leading to the sewer or to any suitable point for the discharge of moisture.

I may use the modified construction seen in Fig. 7, in which the body or lining of the conduit is substantially circular in form. In this case the only change made in the yoke-pieces is that they are curved to correspond with the shape desired and are provided upon their opposite faces with curved ribs 23, to confine the ends of the lining-sections. Inasmuch as a certain superincumbent weight is brought upon those sections owing to their form, an interior supporting-rib 24 is formed upon each vertical face of each yoke-piece.

To permit ready access to the conduit, I may construct the circular lining-sections with removable portions 25 and remove that portion of the curved rib 23 lying outside the same, the weight of the earth being sufficient to retain it in place. I may also remove the upper exterior rib 23 upon the other yoke-piece, as it is not essential to the construction shown.

I may make the lining-sections 4 of any suitable length, and in such case they should conform substantially to the openings embraced by the inner surfaces of the yoke-pieces, the yokes being slipped thereon before the conduit is laid.

It should be noted that I may depart widely from the specific construction shown and described, as the broad idea embraced by my invention consists in the arrangement of a conduit in such manner that the raised outer edge or vertical face of one rail of the road shall form one margin of the slot. This feature in conjunction with the lateral displacement of the conductors, the removal of the slot from the normal line of travel, the simple and economical character of its construction, and the facility with which the conduit may be laid, repaired, and cleansed form the leading points of my invention, in accomplishing which I may deviate considerably from the construction illustrated.

It will be seen that in my invention the conduit may be quickly and readily cleansed by the simple insertion and longitudinal movement of a brush of any suitable kind without displacing any portion of the covering. When access is necessary, however, the covering-rail or the flat rail 2, or both, may be easily taken up at any point.

Having thus described my invention, what I claim is—

1. In a conduit for electric railways, the combination, with a flat track-rail resting on a supporting yoke-piece, of a cover-rail, the two rails forming the margins or walls of the slot, and the cover-rail consisting of a flat plate resting upon the top of a second yoke-piece formed in one piece with a supporting foot-piece and having a depending flange forming one wall of the slot, and metallic lining-sections resting at their ends between ribs on the yoke-pieces, substantially as described.

2. In a conduit for electric railways, the combination, with a flat track-rail and a cover-rail, the two forming the slot, of yoke-pieces formed in one piece with their foot-pieces and supporting the said rails, the flat horizontal plate of the cover-rail resting upon one yoke-piece and having a depending margin forming one wall of the slot, metallic lining-sections resting at their ends between ribs on said yoke-pieces and having their edges lying beneath the outer edges or portions of the rails, and supports for the conductors mounted upon the inner face of one of the yoke-pieces and removed from the vertical plane of the slot, substantially as described.

3. A conduit for electric railways, composed of yokes having yoke-pieces, one supporting the cover-rails and the other the flat rails upon one side of the roadway, metallic lining-sections sustained upon said yokes, and one or more conductors supported from the sides of the conduit and removed from the vertical plane of the slot, substantially as described.

4. In a conduit for electric railways, the combination, with a flat track-rail and a cover-rail forming the slot, of yoke-pieces cast integral with foot-pieces and supporting said rails, metallic lining-sections resting at their ends in seats in the foot-pieces and between ribs on the yoke-pieces, with their edges brought up to the lower faces of the rails, and conductors mounted on supports projecting from the inner faces of the yoke-pieces, substantially as described.

5. In a conduit for electric railways, the combination, with yoke-pieces having flat upper surfaces of different heights, of cover-rails resting upon and having flanges forming one wall of the slot, flat rails resting upon the other and forming by their raised portions the other margin of said slot, metallic lining-sections held by ribs on the yoke-pieces, and one or more conductors removed from the vertical plane of the slot, substantially as described.

6. In a conduit for electric railways, the combination, with yokes consisting of foot-pieces having upright yoke-pieces integral therewith, their upper ends extended inward toward the slot and having horizontal supporting-surfaces, of metallic lining-sections resting in and fastened to seats on the foot-pieces and lying within ribs on the yoke-pieces, an angular cover-rail lying on and bolted to the top of one yoke-piece, and having a depending flange forming one wall of the slot, and a flat rail bolted to the top of the other yoke-piece and forming the other wall or margin of the slot, and one or more conductors arranged upon supports projecting from the inner faces of the yoke-pieces and removed from beneath the slot, substantially as described.

7. In an electric railway, a conduit formed of metallic lining-sections resting and fastened at their ends in seats formed in supporting foot-pieces and confined by ribs or flanges formed on yoke-pieces rising from the foot-pieces, the former constituting supports for the rails forming the slot, substantially as described.

In testimony whereof I have affixed my signature in presence of two witnesses.

DELBERT E. JOHNSON.

Witnesses:
GEO. W. REA,
JAMES A. RUTHERFORD.